M. STEWARD.
Horse-Power Well-Boring Machines.

No. 158,328. Patented Dec. 29, 1874.

WITNESSES:
C. Neveux
A. F. Terry

INVENTOR:
Matthew Steward
BY
ATTORNEYS.

UNITED STATES PATENT OFFICE.

MATTHEW STEWARD, OF NAPOLEON, OHIO.

IMPROVEMENT IN HORSE-POWER WELL-BORING MACHINES.

Specification forming part of Letters Patent No. 158,328, dated December 29, 1874; application filed October 31, 1874.

*To all whom it may concern:*

Be it known that I, MATTHEW STEWARD, of Napoleon, in the county of Henry and State of Ohio, have invented a new and Improved Horse-Power Well-Boring Machine, of which the following is a specification:

My invention consists of a horizontal master-wheel, which gears internally with a vertical counter-shaft that drives the horizontal windlass or drum to hoist the auger, and also gears with a hollow horizontal wheel for turning the auger, and connected with it by two friction-rollers on the wall of the eye of the wheel, against which vertical bars parallel to the shaft and attached to it by arms bear, so as to allow the auger to descend freely, and with but little friction, at the same time that it is revolving. The platform for the attendant of the auger is built over the master-wheel, and the whole machine is contained within the compass of the sweep to which the horse is attached, and so connected together as to make one compact portable machine, which can be very conveniently handled and moved about.

Figure 1:
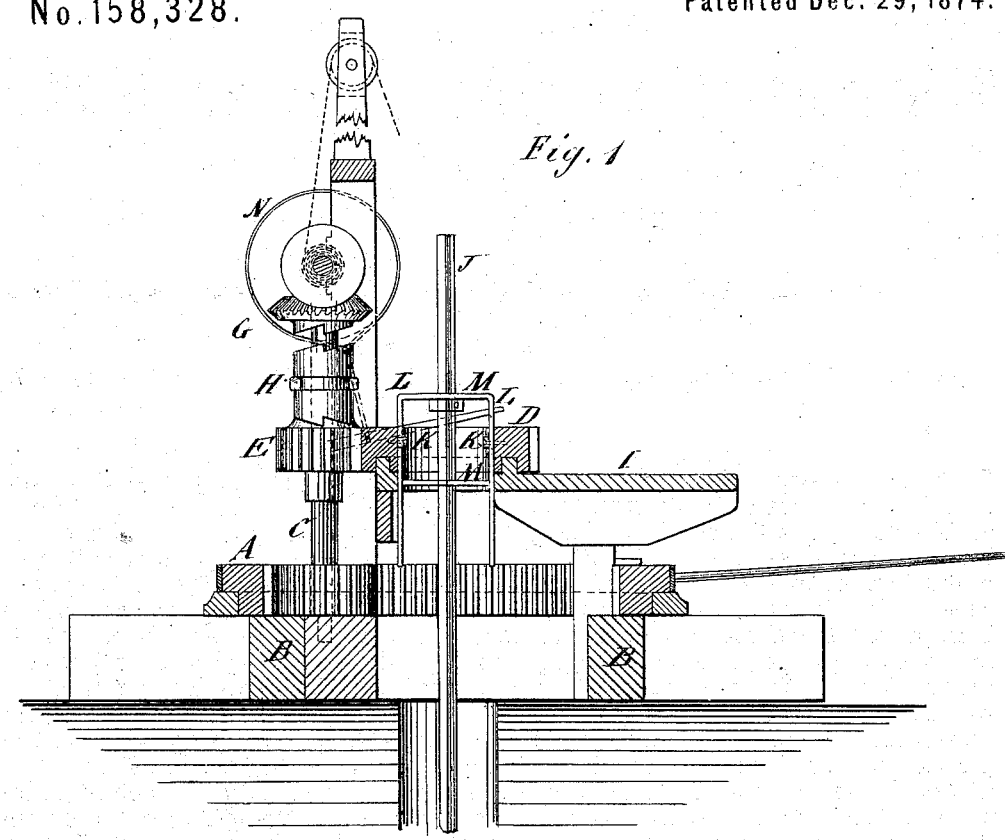
Figure 2:
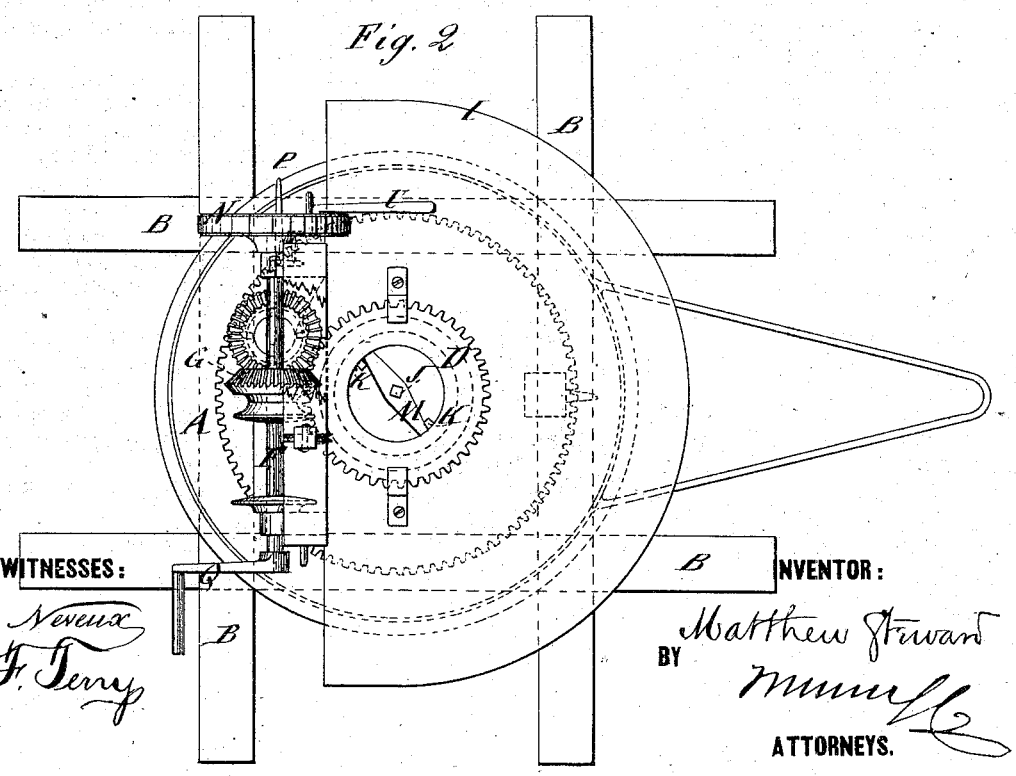

Figure 1 is a sectional elevation of my improved machine, and Fig. 2 is a plan view of the machine.

Similar letters of reference indicate corresponding parts.

A is the master-wheel, which is arranged horizontally on a platform, B, and gears internally with the upright shaft C, which turns the hollow horizontal wheel D by its pinion E, and also turns the windlass F by the bevel-wheels G. The pinion E and wheel G are connected to the shaft by a clutch, H, which engages one when disengaged from the other to throw out the drill-revolving wheel when the drum is working, and vice versa. The wheel D is mounted on the platform I, over the center of the master-wheel, and it turns the auger-shaft J by the friction-rollers K upon the inside wall of the eye, which act on the vertical bars L, attached to the auger-shaft by the arms L, in such manner that the friction is so reduced that the auger will descend, while being turned, without much wear and strain. The brake N for the windlass has a foot-lever, O, arranged in the vicinity of the clutch-lever P, so that one operator can work them both without inconvenience. The hand-crank Q is for raising the rod when lying on the ground.

I am aware it is not new to employ friction-rollers in connection with a boring-shaft, and do not claim such arrangement.

Having thus described my invention, I claim as new and desire to secure by Letters Patent—

1. The master-wheel A, shaft C, wheel D, windlass F, platform I, auger-shaft J, and bed-frame B, combined and arranged substantially as specified.

2. The combination of boring-shaft J, the annular driving-wheel D, the vertical parallel bars L, connected to the shaft by arms M, and the wheels K, operating as stops and friction-guides for said bars, as shown and described.

MATTHEW STEWARD.

Witnesses:
 L. Y. RICHARDS,
 J. S. POPE.